United States Patent
Glass et al.

(10) Patent No.: US 11,550,801 B2
(45) Date of Patent: Jan. 10, 2023

(54) DEPRECATING CONFIGURATION PROFILES FOR CLOUD-BASED IN-MEMORY DATABASE

(71) Applicant: SAP SE, Walldorf (DE)

(72) Inventors: Cora Glass, Berlin (DE); Daniel Kirmse, Berlin (DE); Henning Zahn, Muehlenbeck (DE)

(73) Assignee: SAP SE, Walldorf (DE)

( * ) Notice: Subject to any disclaimer, the term of this patent is extended or adjusted under 35 U.S.C. 154(b) by 46 days.

(21) Appl. No.: 17/173,201

(22) Filed: Feb. 10, 2021

(65) Prior Publication Data

US 2022/0114174 A1    Apr. 14, 2022

Related U.S. Application Data

(60) Provisional application No. 63/089,830, filed on Oct. 9, 2020.

(51) Int. Cl.
*G06F 16/30* (2019.01)
*G06F 16/2458* (2019.01)
(Continued)

(52) U.S. Cl.
CPC ........ *G06F 16/2477* (2019.01); *G06F 16/219* (2019.01); *G06F 16/2322* (2019.01); *G06F 16/248* (2019.01); *G06F 16/2474* (2019.01); *G06F 16/24553* (2019.01); *G06F 16/285* (2019.01)

(58) Field of Classification Search
CPC ... G06F 16/219; G06F 16/2322; G06F 16/285
See application file for complete search history.

(56) References Cited

U.S. PATENT DOCUMENTS

| 10,698,770 | B1 | 6/2020 | Kancharla et al. |
| 2013/0074074 | A1* | 3/2013 | Brown ................ G06F 9/44505 718/100 |
| 2016/0328273 | A1* | 11/2016 | Molka ..................... A61B 8/00 |

OTHER PUBLICATIONS

Buehrle, Anita, "Kubernetes FAQ—How can I route traffic for Kubernetes on bare metal?" <https://www.weave.works/blog/kubernetes-faq-how-can-i-route-traffic-for-kubernetes-on-bare-metal>, Jul. 31, 2018, 7 pages.

(Continued)

*Primary Examiner* — Thu Nguyet T Lee
(74) *Attorney, Agent, or Firm* — Mintz Levin Cohn Ferris Glovsky and Popeo, P.C.

(57) ABSTRACT

A method for managing the configuration of an in-memory database running in a cluster of computing nodes may include receiving a configuration request to apply, to an instance of an in-memory database running on a cluster of computing nodes, one or more temporary changes to a configuration of the in-memory database. In response to the configuration request, an indication to deprecate the configuration profile may be added to a configuration profile associated with the instance of the in-memory database. The configuration profile may be deprecated based at least on the configuration profile being associated with the indication. The deprecating including restoring, to a state prior to the application of the one or more temporary changes, the configuration of the in-memory database. Related systems and articles of manufacture, including computer program products, are also provided.

19 Claims, 11 Drawing Sheets

(51) Int. Cl.
   *G06F 16/23*      (2019.01)
   *G06F 16/28*      (2019.01)
   *G06F 16/248*     (2019.01)
   *G06F 16/21*      (2019.01)
   *G06F 16/2455*    (2019.01)

(56) References Cited

OTHER PUBLICATIONS

Gonzalez, Horacio, "Getting external traffic into Kubernetes—Clusterlp, NodePort, LoadBalancer, and Ingress." <https://www.ovh.com/blog/getting-external-traffic-into-kubernetes-clusterip-nodeport-loadbalancer-and-ingress/>, Feb. 22, 2019, 11 pages.

* cited by examiner

DEPRECATING CONFIGURATION PROFILES FOR CLOUD-BASED IN-MEMORY DATABASE

CROSS REFERENCE TO RELATED APPLICATION

This application claims priority to U.S. Provisional Application No. 63/089,830, filed on Oct. 9, 2020, entitled "CONFIGURATION HANDLER FOR CLOUD-BASED IN-MEMORY DATABASE," the disclosure of which is incorporated herein by reference in its entirety.

TECHNICAL FIELD

The subject matter described herein relates generally to database management and more specifically to a microservice for managing configuration profiles for a cloud-based in-memory database.

BACKGROUND

A database (e.g., a relational database, a non-relational database, and/or the like) may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program items, are provided for managing configuration profiles for a cloud-based in-memory database. In some example embodiments, there is provided a system that includes at least one processor and at least one memory. The at least one memory may include program code that provides operations when executed by the at least one processor. The operations may include: receiving a configuration request to apply, to an instance of an in-memory database running on a cluster of computing nodes, one or more temporary changes to a configuration of the in-memory database; in response to the configuration request, adding, to a configuration profile associated with the instance of the in-memory database, an indication to deprecate the configuration profile; and deprecating, based at least on the configuration profile being associated with the indication, the configuration profile by at least restoring, to a state prior to the application of the one or more temporary changes, the configuration of the in-memory database.

In some variations, one or more features disclosed herein including the following features can optionally be included in any feasible combination. The indication may include a deprecation timestamp.

In some variations, the configuration request may specify a lifespan of the one or more changes. The deprecation timestamp may correspond to the lifespan indicated in the configuration request.

In some variations, the deprecation timestamp may correspond to a default lifespan of the one or more temporary changes in response to the configuration request failing to specify a lifespan for the one or more temporary changes.

In some variations, the deprecating of the configuration profile may be performed in response to a current time exceeding the deprecation timestamp.

In some variations, the configuration request may include a request to create the configuration profile to include the one or more temporary changes.

In some variations, the deprecating of the configuration profile may further include deleting the configuration profile.

In some variations, the configuration request may include a request to apply, to the configuration profile currently used for configuring the instance of the in-memory database, the one or more temporary changes.

In some variations, the configuration of the in-memory database may be restored to a default configuration of the in-memory database.

In some variations, the one or more temporary changes may be applied to resolve a defect at the in-memory database.

In some variations, a job scheduler may create a job executing a script to identify one or more configuration profiles having the indication, and add, based at least on the configuration profile being associated with the indication, the configuration profile to a list for deprecation.

In some variations, the instance of the in-memory database may be part of a container forming pod. The container may further include one or more resources required to satisfy one or more dependencies associated with the in-memory database.

In some variations, the instance of the in-memory database may include a system database and at least one tenant database. The application of the one or more temporary changes may include adjusting the one or more parameters of the system database to configure the system database and/or the at least one tenant database.

In some variations, the configuration profile may be defined as a configuration map including a resource at the cluster of computing nodes.

In another aspect, there is provided a method for managing configuration profiles for a cloud-based in-memory database. The method may include: receiving a configuration request to apply, to an instance of an in-memory database running on a cluster of computing nodes, one or more temporary changes to a configuration of the in-memory database; in response to the configuration request, adding, to a configuration profile associated with the instance of the in-memory database, an indication to deprecate the configuration profile; and deprecating, based at least on the configuration profile being associated with the indication, the configuration profile by at least restoring, to a state prior to the application of the one or more temporary changes, the configuration of the in-memory database.

In some variations, one or more features disclosed herein including the following features can optionally be included in any feasible combination. The indication may include a deprecation timestamp.

In some variations, the configuration request may specify a lifespan of the one or more changes. The deprecation timestamp may correspond to the lifespan indicated in the configuration request.

In some variations, the deprecation timestamp may correspond to a default lifespan of the one or more temporary changes in response to the configuration request failing to specify a lifespan for the one or more temporary changes.

In some variations, the deprecating of the configuration profile may be performed in response to a current time exceeding the deprecation timestamp.

In another aspect, there is provided a computer program product including a non-transitory computer readable medium storing instructions. The instructions may cause operations may executed by at least one data processor. The operations may include: receiving a configuration request to apply, to an instance of an in-memory database running on a cluster of computing nodes, one or more temporary changes to a configuration of the in-memory database; in response to the configuration request, adding, to a configuration profile associated with the instance of the in-memory database, an indication to deprecate the configuration profile; and deprecating, based at least on the configuration profile being associated with the indication, the configuration profile by at least restoring, to a state prior to the application of the one or more temporary changes, the configuration of the in-memory database.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to managing configuration profiles for a cloud-based in-memory database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
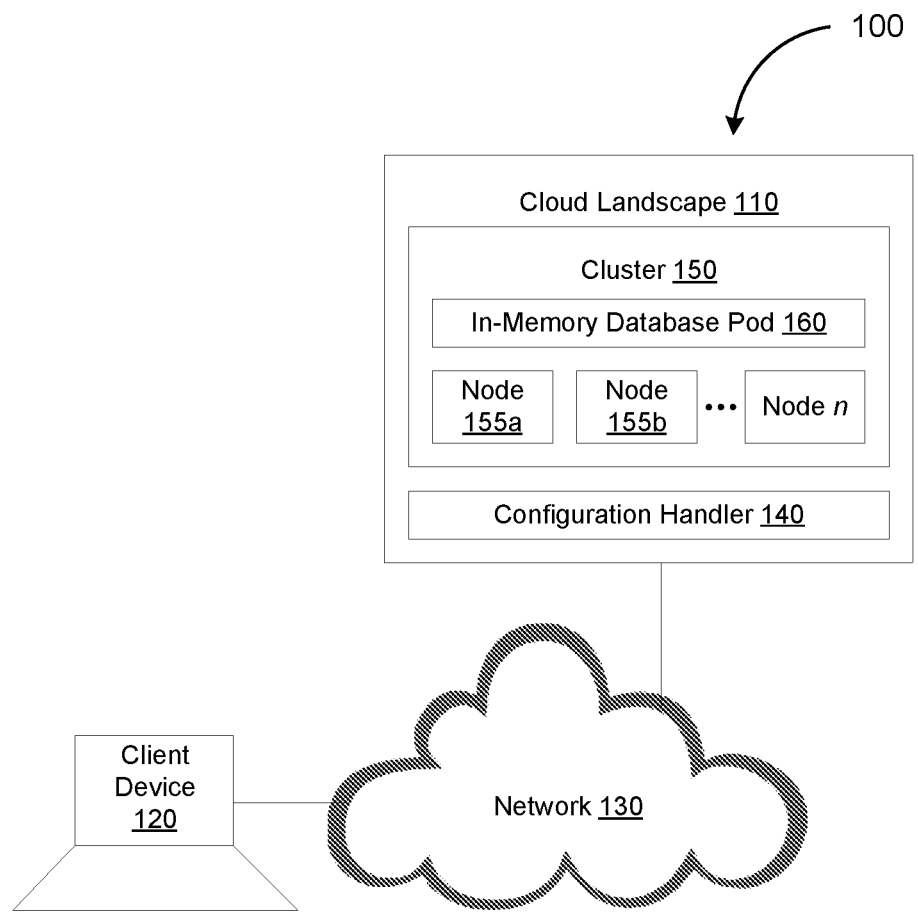
FIG. 1A depicts a system diagram illustrating an example of a database configuration system, in accordance with some example embodiments.

An in-memory database management system may provide its users with fast access, querying and processing. The in-memory database management system may be deployed as cloud-based service such as, for example, a database as a service (DBaaS) and/or the like. A cloud-based in-memory database landscape (or landscape for short) may describe the infrastructure on which one or more instances of the cloud-based in-memory database run. Each instance of the cloud-based in-memory database may be associated with many configuration parameters, which may be set in accordance with the varying needs of different customers.

When operating a landscape with many highly configurable individual instances, it may be necessary to maintain a general overview on how each instance or group of instances are configured. For example, the configuration of a single instance may be changed as a temporary workaround for a defect (e.g., to avoid an outage and/or the like). Usually, a defect may affect multiple instances, thus necessitating a change in the configuration of a group of multiple instances. In this scenario, it may be critical to know which instances are affected by this configuration change in order to enable a subsequent rollback to restore their initial configurations once the defect is resolved. A small quantity of instances may be managed efficiently with few opportunities for errors. However, as the quantity of instances increases, the time and resources required to maintain an overview of these instances may increase exponentially.

As such, in some example embodiments, the management of configuration profiles may be performed by a service such as a configuration handler microservice. The configuration handler microservice may be configured to provide a variety of functionalities including, for example, the secure configuration of instances without accessing the system manually, the configuration of multiple instances via a single request, the on-demand generation of a configuration state overview of multiple instances, and the creation and application of configuration profiles that contain information on the parameters and the corresponding values.

In some example embodiments, one or more instances of a cloud-based database system may run in a cluster of computing nodes forming a landscape and configured to run the cloud-based database system as a containerized application. This cluster of computing nodes may be maintained by a service configured to create, update, scale, and delete one or more such clusters of computing nodes on-demand. Moreover, these clusters of computing nodes may enable containerization in which an application, such as the in-memory database system, is bound together with all its necessary resources to satisfy all dependencies. The resulting structure is called a container, which may be capable of running in different computing environments. For example, if Docker files containing the commands that may be called on the command line to assemble an image was used to build the container (e.g., the image used to create the container), the container may be able to run in any computing environments with a Docker engine installed.

In some example embodiments, an instance of the cloud-based in-memory database may correspond to a pod, which binds one or more containers. The objective of deploying an instance of the in-memory database on one or more clusters of computing nodes may be to manage and monitor the corresponding pods running on each cluster of computing nodes. For example, the clusters may be self-healing such that if a pod is not behaving as expected, if the pod stops to run, or if the pod is rescheduled from a nonfunctioning node in cluster to a functioning one, the response may be to execute one or more predefined routines, restart the pod, alert the operator of the landscape, or reschedule the pod on another cluster of computing nodes. The clusters of computing nodes may also provide users with multiple resource types besides the pod. The purpose of these resources may be to define the properties that they are associated with. These structures may all be a part of the node cluster ecosystem. In general, they are each an abstraction of an aspect of the configuration. The resource types may, for example, be associated with the cluster, a pod, or used for security and or telecommunication purposes.

Resources associated with the cluster may define, for example, the quantity of computing nodes included in each cluster or operating system (or version of operating system) in use. Resources referring to the pod may declare which containers belong in that pod, how many replications shall be available, and define the healthy behavior of each container. Other resources may be used to configure access permissions or for the management of sensitive data. It may also be possible to create custom resource types and assign labels to different kinds of cluster resources. These may be saved in the metadata of the node cluster resource. For example, using a node cluster application programming interface (API) client (e.g., a command-line tool such as kubectl), it is possible to select one or more pods with a specific label and a specific value.

Instances of the in-memory database may be node cluster pod resources. These pods may each including a container corresponding to the actual in-memory database. The in-memory database may include a system database (SystemDB) and at least one tenant database (TenantDB). The system database may be used by the system administrator while the tenant database may be used by customers to save and manage their data. Therefore, customers have access to the tenant database portion of the in-memory database but not the system database. Meanwhile, system administrators may have permanent access to the system database but temporary access to the tenant database, for example, until the in-memory database is fully provisioned. Configuring an in-memory database may include adjusting the parameters of the corresponding system database to either configure the system database itself or as part of configuring the corresponding tenant database. In some example embodiments, the configuration handler microservice may be configured to handle the configuration of an in-memory database including the system database and the tenant database.

FIG. 1A depicts a system diagram illustrating an example of a database configuration system 100, in accordance with some example embodiments. Referring to FIG. 1A, the database configuration system includes a cloud landscape 110 and a client device 120, which are communicatively coupled via a network 130. The client device 120 may be a processor-based device including, for example, a mobile device, a wearable apparatus, a personal computer, a workstation, an Internet-of-Things (IoT) appliance, and/or the like. The network 130 may be a wired network and/or a wireless network including, for example, a public land mobile network (PLMN), a local area network (LAN), a virtual local area network (VLAN), a wide area network (WAN), the Internet, and/or the like.

Referring again to FIG. 1A, the cloud landscape 110 may include a configuration handler 140 and a cluster 150 of one or more computing nodes including, for example, a first node 155a, a second node 155b, and/or the like. In some example embodiments, an in-memory database pod 160 may run on the cluster 150, for example, the first node 155a, the second node 155b, and/or the like. The in-memory database pod 160 may include one or more containers containing an in-memory database and the resources required to satisfy the dependencies associated with the in-memory database (e.g., applications required for running the in-memory database).

Figure 1B:
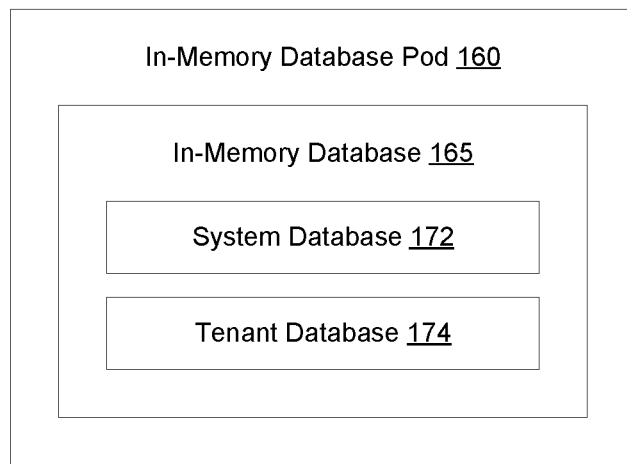
FIG. 1B depicts a schematic diagram illustrating an example of an in-memory database system pod, in accordance with some example embodiments.

To further illustrate, FIG. 1B depicts a schematic diagram illustrating an example of the in-memory database pod 160, in accordance with some example embodiments. As shown in FIG. 1B, the in-memory database pod 160 may include an in-memory database 165. Moreover, FIG. 1B shows the in-memory database 165 as including a system database 172 and at least one tenant database 174. Configuring the in-memory database 165 may include adjusting the parameters of the system database 172 to either configure the system database 172 itself or as part of configuring the tenant database 174. In some example embodiments, the configuration handler 140 may be configured to handle the configuration of the in-memory database 165 including the system database 172 and the tenant database 174. It should be appreciated that a customer of the in-memory database 165 may have access to the tenant database 174 but not the system database 172. A system administrator may have permanent access to the system database 172 but only temporary access to the tenant database 174, for example, until the in-memory database 165 is fully provisioned.

The system database 172 may include different layers, which make it possible to configure system-specific parameters which are applicable to the in-memory database 165 as a whole and database-specific parameters which are applicable to the tenant database 174. The layers of the system database 172 may include, for example, a default layer, a system layer, a database layer, a host layer, and/or the like.

In multiple-host systems, the host layer may support the configuration of multiple hosts (e.g., multiple tenant databases), although the in-memory database 165 is not implemented as a multiple-host system.

The default layer of the system database 172 may include the default values of all available parameters. These values may be applied when restoring the configuration of the in-memory database 165 to a default state. However, it should be appreciated that these default values may not be applied indiscriminately when restoring the configuration of the in-memory database 165. The system layer of the system database 172 may include system-specific configuration parameters. These are the parameters that configures the in-memory database 165 as a whole, including the tenant database 174. Absent an explicit configuration, a parameter may be set to a default value, for example, from the default layer. The database layer of the system database 172 may include database-specific parameters, which are applicable to the tenant database 174. The database layer of the system database 172 may also be available in the tenant database 174. Moreover, the presence of this database layer may enable the tenant database 174 to be configured via the system database 172. A parameter from the database layer that lacks an explicit configuration may be set to a value from the system layer.

The configuration parameters associated with the in-memory database 165 may be saved in the system database 172 and partially in the tenant database 174. In addition, the configuration parameters of the in-memory database 165 may be saved in one or more configuration files (e.g., initialization (INI) files and/or the like) located in a file system of the in-memory database container. The configuration files may be plaintext files holding the parameters of the in-memory database 165 and the corresponding values. The configurations of the in-memory database 165 may be executed by adjusting the configuration files and triggering a configuration of the system database 172 via a separate tool installed in the in-memory database 165. The configuration parameters included in the configuration files may follow a basic structure (e.g., INT—filename, layer, section, key: value).

Because the in-memory database 165 may require reconfiguration to avoid extensive downtime, the time required to execute a configuration of the in-memory database 165 should be minimized. The configuration handler 140 may therefore be configured to handle the configuration of the in-memory database 165 with minimal application programming interface (API) communications and calculations to avoid wasting computing resources. Because of direct interaction with customer data inhabiting the tenant database 174, the configuration handler 140 may be granted certain permissions in order to enhance the security of the configuration handler 140. Moreover, referring again to FIG. 1A, the cloud landscape 110 may include the cluster 150, which may be a distributed system capable of being scaled up or down dynamically in size. As such, the configuration handler 140 may be configured to support this scalability.

In some example embodiments, the configuration handler 140 may be configured to support the configuration of the in-memory database 165. For example, the configuration of the in-memory database 165 may be performed based on profile 200 containing the parameters and the corresponding values. In critical situations, the profile 200 may include temporary changes, for example, to resolve a defect at the in-memory database 165. Configuration changes in the profile 200 may be forwarded to the in-memory database 165. It may be possible to identify a current state of the in-memory database 165 including, for example, if and how the in-memory database may be configured (or reconfigured).

As shown in FIG. 1A, the configuration handler 140 may be running as part of the cloud landscape 110 hosting the in-memory database 165. Otherwise, the configuration handler 140 may be required to execute the configuration of the in-memory database 165 from outside of the cluster 150. As such, the inclusion of the configuration handler 140 within the cloud landscape 140 may minimize communication between the cluster 150 and external entities, which is favorable for enhanced security and performance.

Figure 2:
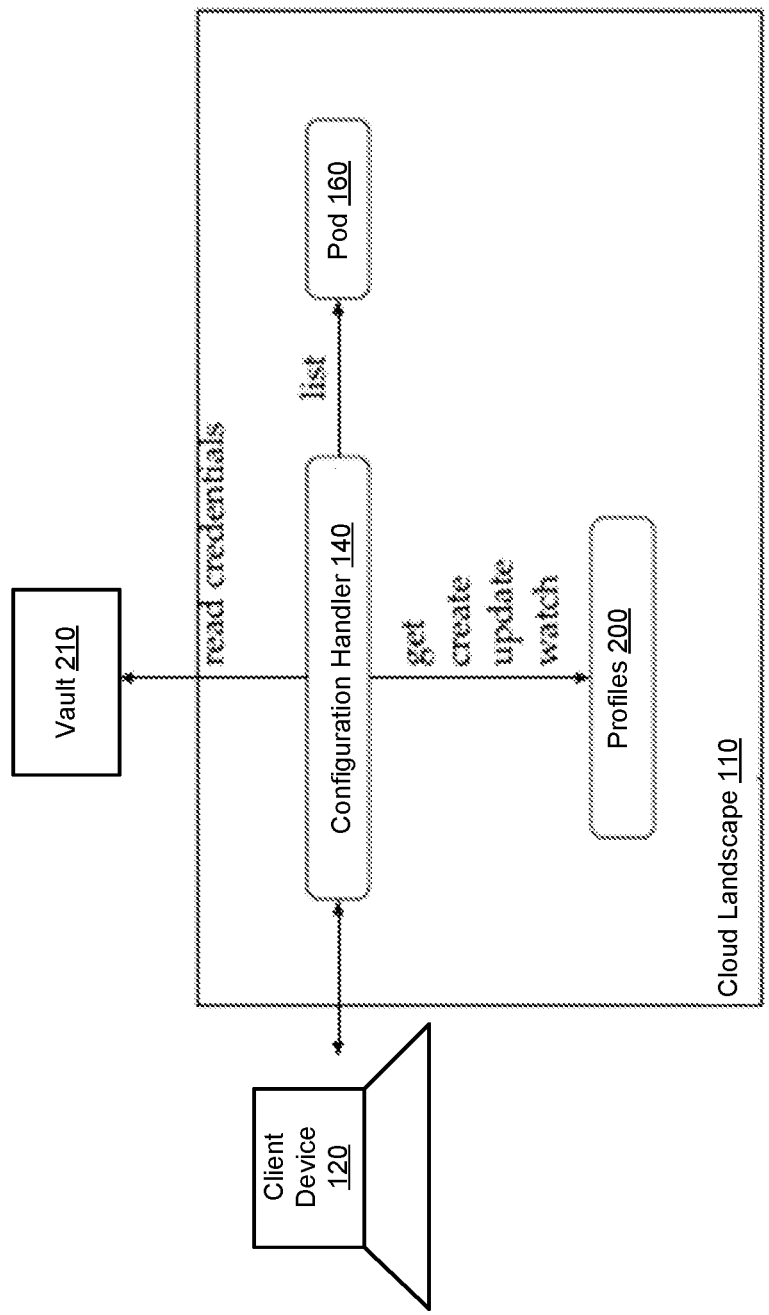
FIG. 2 depicts a schematic diagram illustrating an example of the relationship between the components for configuring an in-memory database, in accordance with some example embodiments.
Figure 3:
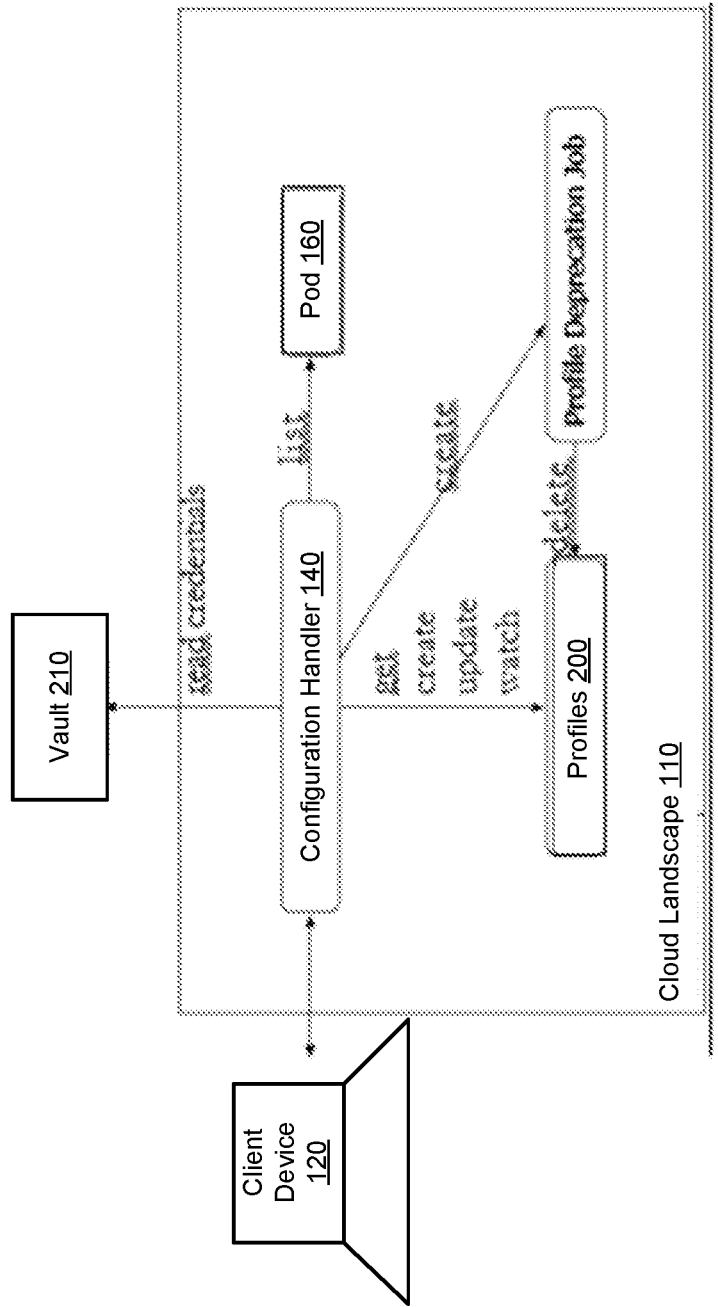
FIG. 3 depicts a schematic diagram illustrating an example of the components for deprecating a configuration profile, in accordance with some example embodiments.
Figure 4:
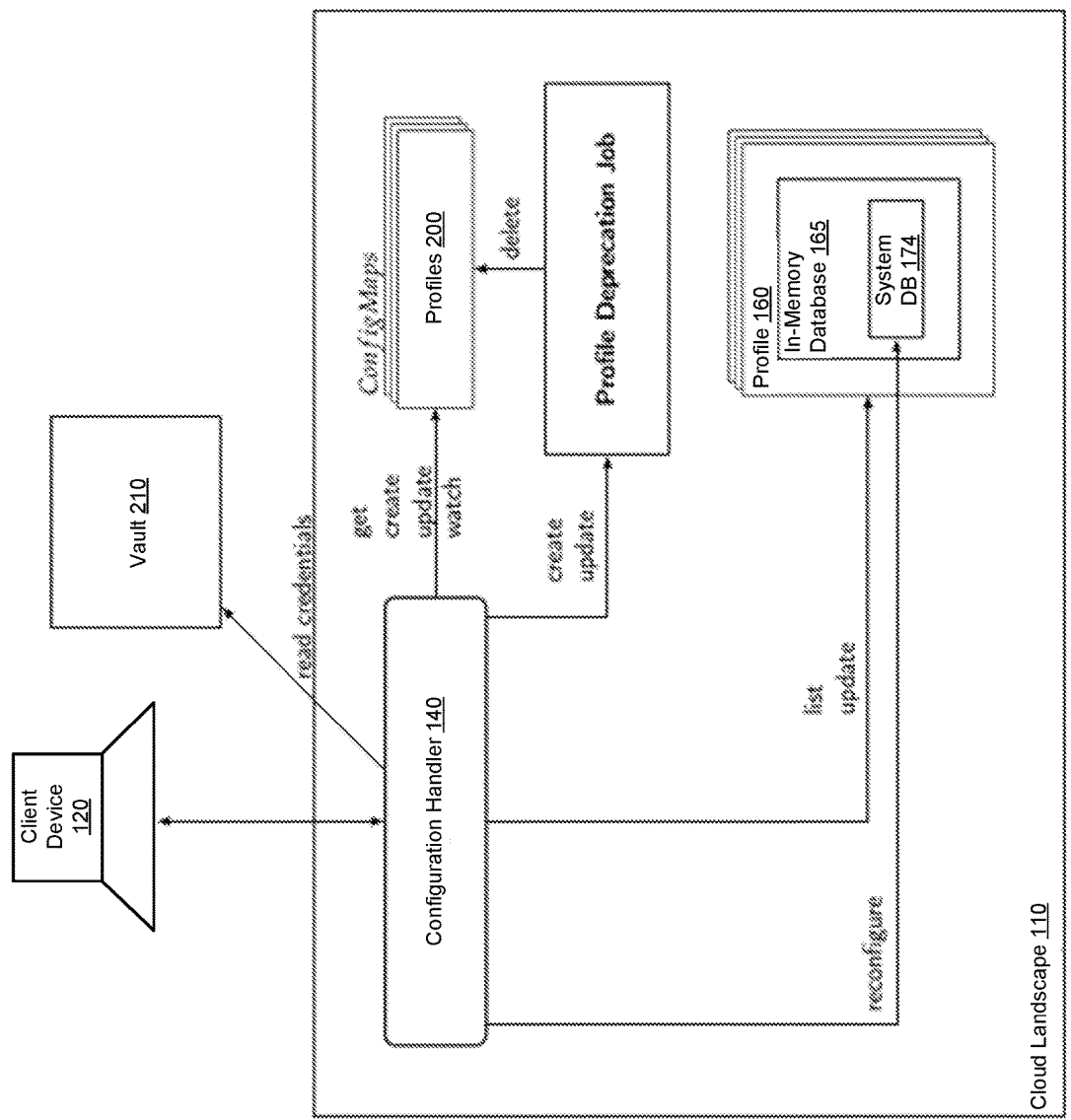
FIG. 4 depicts a schematic diagram illustrating an example of an architecture of a configuration handler, in accordance with some example embodiments.

Referring to FIGS. 2-4, in some example embodiments, the in-memory database 165 may be associated profile 200 associated with the in-memory database 165 may be managed at a central location. For example, profile definitions may be subject to a release process, which is rendered possible at the central location. For security purposes, permission to invoke the configuration handler 140 may be limited, for example, to the operations team and developers with the permission to support the in-memory database 165. Once deployed, the configuration handler 140 may obviate manual configuration of the in-memory database 165 as well as configuration by other services.

In some example embodiments, the configuration handler 140 may receive, from the client device 120, one or more requests to configure the in-memory database 165. For example, the configuration handler 140 may receive one or more hypertext transfer protocol (HTTP) requests. The configuration handler 140 may handle a request without authenticating the client device 120 and/or a user associated with the request. Alternatively and/or additionally, the configuration handler 140 may perform authentication in order to impose usage restrictions and/or to ensure that the request originate from users with the necessary permissions.

The cluster 150 may expose a service, such as the microservice associated with the configuration handler 140, in a variety of ways. One technique may be to expose the service externally using a load balancer, which may be a node cluster service resource with an Internet Protocol (IP) address and configured to route traffic to a specific port (e.g., NodePort) at each of the first node 155a, the second node 155b, and/or the like in the cluster 150. In some example embodiments, the configuration handler 140 may be mapped to this specific port (e.g., the NodePort). The configuration handler 140 may receive requests (e.g., HTTP requests) sent to the IP address of the load balancer. The load balancer may be configured with a port as well as a target port. The container of the configuration handler 140 may be configured to listen on the target port.

Alternatively, the microservice associated with the configuration handler 140 may be exposed using a ClusterIP, which may be another node cluster resource that exposes the microservice associated with the configuration handler 140 on an internal IP address within the cluster 150. Additionally, a proxy may be open that connects the cluster 150 with an external machine.

The configuration handler 140 may be configured to check, on a continuous basis, changes to a label or a condition for a specific resource. For example, when the in-memory database pod 160 undergoes a change, the condition for that resource may change from "configured" to "configuration requested." The resource may also contain additional configuration details that require execution including, for example, configuration parameters and values or an identifier of the profile 200. The configuration handler 140 may perform this check by applying a polling method.

Alternatively, the configuration handler 140 may be configured to act on an on-demand basis. This means that the configuration handler 140 does not execute any explicit checks but may remain in a state of busy waiting until a request arrives, for example, from the client device 120. It should be appreciated that the polling method may be less resource efficient in cases where the configuration handler 140 is not in constant use.

In some example embodiments, the profile 200 may be a resource containing an identifier, one or more configuration parameters for the in-memory database 165, and the desired values for the one or more configuration parameters. The profile 200 may be configured to exist independently within the cluster 150, with or without the presence of the configuration handler 140 and other services. The profile 200 may be separate from the configuration handler 140 such that the two are deployed as separate artifacts. Separating the profile 200 from the configuration handler 140 may enable the profile 200 to go through a release process that is separate from the release process associated with the configuration handler 140. In order to achieve this independence between the profile 200 and the configuration handler 140, the profile 200 may be part of a separate repository containing a node cluster package (e.g., Helm chart and/or the like) defining the profile 200. This node cluster package may be associated with a node cluster package manager (e.g., Helm and/or the like) configured to define, deploy, and upgrade node cluster resources.

The profile 200 may be defined as a configuration map (e.g., ConfigMap), which may be a node cluster resource that manages data in form of a map and supports strings as values. The configuration map may also include labels and other metadata. Because an in-memory database container may be built from different image versions of the in-memory database 165, an identifier associated with the profile 200 may indicate the version of the in-memory database 165 supported by the profile 200. For example, the identifier of the profile 200 may include a profile name indicating a purpose of the configuration (e.g., bug-A, workload-XL, and/or the like). The identifier of the profile 200 may further include a version of the in-memory database 165 separate, for example, from the name of the profile by a delimiting character (e.g., a hyphen and/or the like). The configuration map may exist in the cluster 150 without any dependencies and may be subject to a release process. Alternatively, instead of placing the profile 200 within the cluster 150, it should be appreciated that the profile 200 may be made available through a web-based tool with a user interface such that the profile 200 may be located by sending the parameters and the identifier of the profile 200 to the configuration handler 140.

To further illustrate, Table 1 below depicts an example of a configuration profile.

TABLE 1

```
apiVersion : v1
kind: ConfigMap
metadata:
    name: sample -0.0.1
    namespace : default
    labels:
        type: in-memory database -configuration -profile
        profile-name: sample
        profile-version: "0.0.1"
data:
    configurationspecs : |
-   filename: "global . ini"
```

TABLE 1-continued

```
        layer: "SYSTEM"
        section: "persistence"
        key: "log_segment_size_mb"
        value: " 111 "
-   filename: "nameserver . ini"
        layer: "SYSTEM"
        section: " auditing_csvtextfile"
        key: "max_files"
        value: "8"
```

The configuration of the in-memory database 165 may involve multiple components as shown in FIGS. 2 and 4. As shown in FIG. 2, the configuration of the in-memory database 165 may be initiated by the client device 120 sending, to the configuration handler 140, a configuration request. The configuration request may include one or more parameters of the in-memory database 165 and the corresponding values that these parameters should be set to as part of the configuration. Alternatively and/or additionally, the configuration request may identify a configuration profile, for example, by including the identifier associated with the profile 200. It should be appreciated that a single configuration request may affect multiple in-memory databases.

Table 2 below depicts an example of a configuration request for the configuration of a single in-memory database with single parameters.

TABLE 2

```
curl -d '{ "instancetype": "hana", "instanceid": "<HANAID>", "
    instanceversion": "<HANA-version>", "parameters": [ {"
    filename":"dummy.ini","layer":"SYSTEM","section":"dummy-
    section","key":"dummy-key","value":"2"}, {"filename":"foo.
    ini","layer":"SYSTEM","section":"foo-section","key":"foo-key
    ","value":"true"}}}' <external-ip>:<target-port>/configure
```

Table 3 below depicts an example of a configuration request for the configuration of a set of in-memory databases with a configuration profile.

TABLE 3

```
curl -d '{ "instancetype": "hana", "instances":[ "<HANAID-1>",
    "<HANAID-2>"], "instanceversion": "<HANA-version>", "profile
    ": "<profile-name>" }' <external-ip>:<target-port>/configure
```

In some example embodiments, the load balancer may route the configuration request from the client device 120 to the configuration handler 140, which may parse and validate the configuration request. The configuration handler 140 may verify whether the requested instance of the in-memory database, for example, the in-memory database 165, is present in the cluster 150. The configuration process may be terminated if the configuration handler 140 determines that the requested instance of the in-memory database is not present in the cluster 150. In the event the configuration request includes the identifier of a configuration profile, such as the identifier associated with the profile 200, the configuration handler 140 may also verify the presence of the requested profile in the cluster 150. If the configuration handler 140 is able to locate the profile 200, for example, based on the identifier included in the configuration request, the configuration handler 140 may retrieve the parameters and the corresponding values from the profile 200. The configuration handler 140 may further configure the in-memory database 165 according to these parameters and values.

In some example embodiments, the configuration handler 140 may verify the access credentials associated with the configuration request in order to configure the in-memory database 165. For example, upon verifying the presence of the in-memory database 165 and the profile 200, the configuration handler 140 may retrieve one or more credentials (e.g., username, password, and/or the like) for accessing the system database 174. The access credentials for the system database 172 may be specific to the cloud landscape 110 such that a single set of credentials may be valid for multiple in-memory databases running in the cloud landscape 110. Moreover, as shown in FIGS. 2-4, the access credentials associated with the system database 172 may be stored in a vault 210 (or another data store). The configuration handler 140 may include a client associated with the vault 210 that enables the configuration handler 140 to retrieve, from the vault 210, the access credentials associated with the system database 172. The client may require permission to read the credentials from a specific path in the vault 210. This permission may be provided to the configuration handler 140 via a service account included in the configuration of the cluster 150. The service account resource of the cluster 150 may be part of a role-based access permission (RBAC) scheme. For instance, permissions may be defined based on roles, which may be bound to service accounts. As such, the service account may receive permissions as well as grant permissions, for example, to the in-memory database pod 160.

Upon obtaining the access credentials, the configuration handler 140 may further determine one or more hostnames associated with the in-memory database 165. For example, the hostname may include a fixed prefix, which is internally known, and an identifier of the in-memory database 165. For each in-memory database that is being configured, including the in-memory database 165, the configuration handler 140 may establish a structured query language (SQL) connection and execute a configuration statement for each parameter affected by the configuration request. To further illustrate, Table 4 below depicts an example of a configuration statement.

TABLE 4

ALTER SYSTEM ALTER CONFIGURATION ( '<INI -filename > ', '<layer > ')
   SET ( '<section > '<key >')='<value > ' WITH RECONFIGURE Upon successfully configuring an in-memory database, such as the in-memory database 165, the configuration handler 140 may close the SQL connection. Furthermore, the configuration handler 140 may update the identifier of the profile that was used in the configuration, change an existing profile identifier to that of the one that was used in the configuration, or add an indication to indicate that no profile was used in the configuration (e.g., 'single-param'). If multiple in-memory databases are being configured, the configuration process may be complete upon completing the configuration of each in-memory database.

In some example embodiments, a profile identifier may be used to retrieve an overview on how an in-memory database, such as the in-memory database 165, is configured. A command-line tool (e.g., Kubectl and/or the like) may be used to identify every in-memory database that have been configured with a specific configuration profile, such as the profile 200, may be identified based on the corresponding profile identifiers. Table 5 below depicts an example of a command to retrieve all in-memory database pods that have been configured with a specific profile.

TABLE 5 kubectl get pod -l profile=<profile -ID >

Alternatively, the configuration handler 140 may execute each configuration statement by at least adjusting the corresponding parameters in the initialization (INI) files of the in-memory database 165. The configuration of the in-memory database 165 may subsequently be executed based on the altered initialization file. To do so, the configuration handler 140 may require access to the in-memory database pod 160 of the in-memory database 165 in order to adjust the initialization files and trigger the configuration (or reconfiguration). Permission to the in-memory database pod 160 to configure the in-memory database 165 may be granted to the configuration handler 140 by applying a role-based access permission (RBAC) scheme. However, it should be appreciated that the role-based access scheme may provide broad permission to all pods included in the cluster 150 rather than specific permission to any one particular pod, absent the name of a specific resource or a specific instance of the resource. As such, it may be more secure for the configuration handler 140 to configure the in-memory database 165 via SQL statements rather than accessing the in-memory database pod 160 directly.

The profile 200 may, as noted, be defined as a configuration map (e.g., ConfigMap) that undergo a release process, for example, when one or more changes are made to the profile 200. However, there may be scenarios that require the omission of the release process in order to expedite the addition and/or adjustment of the profile 200. For example, the configuration handler 140 may be configured to create and/or adjust the profile 200 without a release process. Instead, the configuration handler 140 may create and/or adjust the profile 200 in response to a configuration request (e.g., an HTTP request and/or the like) to create and/or adjust the profile 200. Table 6 depicts an example of a request to create and/or change a configuration profile without a release process.

TABLE 6 curl -d '{ "requesttype": "<request-type>", "profilename": "<profile-name>", "profileversion": "<HANA-version>", "lifespan": 3, "parameters": [{"filename":"dummy.ini","layer":"SYSTEM","section":"dummy-section","key":"dummy-key","value":"2"}] }' <external-ip>:8080/profile Referring to Table 6, it should be appreciated that the lifespan value specified in the configuration request, which indicates the quantity of time during which the profile 200 is valid, may be optional. When a request to create the profile 200 includes a lifespan value, the profile 200 may be deleted after the specified quantity of time. Alternatively, if the request to create the profile 200 does not include a lifespan value, the resulting profile 200 may be associated with a default lifespan value (e.g., 7 days or a different quantity of time).

In some example embodiments, the configuration handler 140 may validate a request to create or change the profile 200 including by confirming an existence of the profile 200. It should be appreciated that a request to create the profile 200 may be invalid if the profile 200 already exists whereas a request to change the profile 200 may be invalid if the profile 200 is nonexistent. The process to create or change the profile 200 may terminate if the configuration handler 140 fails to validate the request. Otherwise, the configuration handler 140 may prepare the parameters included in the request to satisfy profile convention such that the profile 200, which is a node cluster configuration map resource, may be created or updated with the parameters specified in the request. To response to a creation request, the configuration handler 140 may attach, to the configuration map, a label including a date (e.g., a deletion time) determined based on the lifespan value of the profile 200. The profile 200 may be deprecated based on that date. In the case of a change request, the configuration handler 140 may overwrite an entire parameter section of the configuration map. Thus, even if the request changes some but not all of the parameters associated with the in-memory database 165, the change request may include the entire set of parameters present in the profile 200.

The change to the profile 200 may be propagated to every in-memory database configured with the same profile 200. This may avoid inconsistency in the configuration of in-memory databases. Thus, where there are multiple in-memory databases configured with the same configuration profile, such as the profile 200, the configurations of the in-memory databases may be the same even if the configurations are executed at different times.

To achieve this consistency, the configuration handler 140 may be configured to monitor for changes in configurations profiles such as the profile 200. For example, the configuration handler 140 may be configured to detect events associated with the configuration profiles, such as the configuration maps associated with the corresponding "profile-name" label. This monitoring may be performed by a thread that runs in parallel with the thread performing the configuration of the in-memory databases such as the in-memory database 165. If the configuration handler 140 detects an addition, a deletion, and/or a change to a configuration map, the configuration handler 140 may trigger a handling process to configure (or reconfigure) the in-memory database 165 based on the detected addition, deletion, and/or change to the configuration map. It should be appreciated that each handling process may be run as a separate thread (e.g., light weight threads such as goroutines and/or the like) to avoid conflicts between the handling of the configuration and the detection of configuration map events.

The deletion of a configuration map may trigger a different handling process than a change to the configuration map. At the outset, the configuration handler may verify whether the configuration map is in fact a configuration profile, such as the profile 200. In order to respond to a request to delete a configuration map, the configuration handler 140 may identify all in-memory databases using the same profile 200 and execute a rollback of the configuration to a default configuration. The profile name label for the affected in-memory databases may also be set to "default." Alternatively, in the event of a change to the configuration map, the configuration handler 140 may identify the in-memory databases using the corresponding profile and roll back their configurations to a default configuration before reconfiguring the parameters of each in-memory database in accordance with the changes to the configuration map. Upon completing the deletion and/or change to the configuration map, the configuration handler 140 may terminate the threads (e.g., goroutines) handling the configuration (or reconfiguration).

Referring to FIGS. 3-4, the configuration handler 140 may, in some example embodiments, perform a deprecation of a configuration profile, such as the profile 200, in order to determine whether the configuration profile should exists in its present state. For example, deprecation may include detecting when the profile 200 has been changed by the configuration handler 140 and should be reset to a previous state (e.g., defined by a node cluster package associated with the profile 200). In other scenarios, the profile 200 may have been created by the configuration handler 140 and should be deleted. It should be appreciated that profiles created directly by the configuration handler 140 may be created as a temporary workaround or a fix to a defect. As such, these profiles may exist temporarily and not longer than a required length of time because these profiles have not gone through a release process. Accordingly, when created, these profiles may have a deletion time label indicating a date on or after which the profile should be deleted.

In some example embodiments, profile deprecation may be performed on a periodic basis to identify deprecated profiles within the cluster 150. The frequency of such checks may be set based on the lifespan value of the profiles within the cluster 150. For example, profile deprecation may be realized with a node cluster time-based job scheduler (e.g., CronJob and/or the like) and a script (e.g., Python3 and/or the like). The configuration handler 140 may deploy the time-based job scheduler upon creation of the configuration handler 140. The presence of the time-based job scheduler may be verified each time the configuration handler 140 creates a profile. The time-based job scheduler may be redeployed if it is missing. Otherwise, the configuration handler 140 may update the time-based job scheduler to ensure that the definition of the scheduler matches that defined by the configuration handler 140.

The time-based job scheduler may be configured to create, within the cluster 150, one or more jobs based on a schedule. The job may create a pod, which may run a container executing the script (e.g., Python3 script and/or the like). As shown in FIG. 3, this container may include permissions to build a node cluster application programming interface (API) capable of listing and deleting configuration maps. The script may be executed to obtain all configuration maps with a deletion time label. The deletion time associated with a configuration map may be configured to a current timestamp to determine whether the configuration map should be deprecated. A deprecated configuration (e.g., a configuration map past its deletion time) may be added to a garbage collection list for subsequent deletion. Once the job to deprecate profiles is complete, the pod is terminated and the time-based job scheduler may create the same job again at a later time (e.g., in accordance with a schedule).

In some example embodiments, the configuration of the in-memory database 165 may undergo a rollback in two scenarios. The first scenario may be that the in-memory database 165 is not in a default configuration and require reconfiguration to achieve the default configuration. The parameters that currently differ from the default configuration do not have to be included in the set of parameters are part of the configuration request. Nevertheless, these parameters may be reset to their default values before the in-memory database 165 may be reconfigured by the configuration handler 140. Doing so may ensure consistency in the configuration of the in-memory database 165. That is, in-memory databases configured with the same profile may have the same configuration, without a single parameter set to a different value. The second scenario that necessitates a rollback may be that the in-memory database 165 is configured with a deprecated profile. For example, after the profile 200 is deleted, the configuration of the in-memory database 165 may be restored to a default configuration to avoid having the in-memory database 165 be configured based on an expired and/or nonexistent profile 200.

To enable a rollback to default parameter values, the default values of various parameters may be maintained at the system database 172, for example, in the default layer. However, there may be infrastructure services in place that reconfigure the in-memory database 165 before it is fully provisioned. These reconfiguration may introduce discrepancies between the desired default parameter values and those listed in the default layer of the system database 172. Accordingly, when the in-memory database 165 is reconfigured by the configuration handler 140 for the first time, the configuration handler 140 may save, for example, in a map, the parameter values included in the configuration request as the default parameter values for the in-memory database 165. Table 7 depicts an example of the structure of a default value map. As shown, a single parameter may include multiple sub-parameters such that a parameter may be implemented as a data structure (e.g., a struct and/or the like) containing multiple values.

TABLE 7

{ <hana-ID1>: [ <parameter1> : <value2>, <paramter2> : <value2 >], <hana-ID2> : ...}

The default values for a specific in-memory database, such as the in-memory database 165, may be retrieved based at least on an identifier of the in-memory database 165. Default values may be saved for each in-memory database, for example, in a map at the configuration handler 140 such that the data is saved in the memory of the configuration handler 140. If the in-memory database 165 is about to be reconfigured, the configuration handler 140 may first check if the in-memory database 165 is in a default configuration. This may be determined based on the in-memory database pod 160 not having a profile label or a profile label that is set to "default." In the event the in-memory database 165 is already in a default configuration, a rollback may not be necessary before the in-memory database 165 is subject to a reconfiguration. Alternatively, if the in-memory database 165 is not in the default configuration, the configuration handler 140 may retrieve default parameter values from the map and configure the in-memory database 165 based on the default parameter values before proceeding with the reconfiguration of the in-memory database 165.

Nevertheless, default parameter values may be lost in the event of a termination and/or a restart at the configuration handler 140. In the absence of default parameter values, the rollback of the in-memory database 165 may not be possible. As such, in the event of a termination and/or a restart at the configuration handler 140, the current parameter values of the in-memory database 165 may be saved as default values, for example, in the default layer of the system database 172. Optimally, when the in-memory database 165 is reconfigured multiple times, the configuration process may include restoring the previously configured parameters, saving the current values of the parameters require reconfiguration, and executing the reconfiguration. In the event of a failed rollback attempt, the values of already configured parameters may be saved as default parameter values.

Referring again to FIGS. 2-4, the configuration handler 140 and the definition of the time-based job scheduler (e.g., CronJob and/or the likeP) may be located in a same repository. The configuration handler 140 and the time-based job scheduler may use a read-only template with instructions for creating a correspond container (e.g., a Docker image and/or the like) that must be built and pushed before the deployment of the configuration handler 140, for example, via a node cluster package (e.g., Helm chart and/or the like), is possible. The configuration profiles, such as the profile 200, may also be located in a node cluster package but in a separate repository. It may be possible to create multiple node cluster packages and/or repositories for holding the configuration profiles at least because the configuration profiles do not depend on any services.

For example, a first template (e.g., a first Docker image) may create a container for the configuration handler 140 while a second template (e.g., a second Docker image) may include the script for checking deprecated configuration profiles. One node cluster package (e.g., Helm Chart) may include the definitions of the node cluster resources to deploy the configuration handler 140. This may include the deployment of the pod in which the container for the configuration handler 140 is running, the service account definition for the role-based access permission (RBAC) scheme, and a definition of the load balancer service that exposes the configuration handler 140 to outside of the cluster 150. A second node cluster package may include a collection of profiles such as, for example, multiple configuration map definitions.

Because the configuration handler 140 may be exposed to the outside of the cluster 150, access to the configuration handler 140 may be controlled based on permissions. For example, the configuration handler 140 may be configured to provide access to any user with the right information. In such a scenario, the configuration handler 140 may not validate a request based on whether the requester hold the necessary permissions to access the configuration handler 140. Alternatively, the configuration handler 140 may support different groups of users with different access rights. For instance, a first user group may have access to the reconfiguration functionalities of the configuration handler 140 while a second user group may have the ability to create and adjust configuration profiles.

In some example embodiments, access to the configuration handler 140 may be limited to one or more groups of users, such as one or more groups of users having existing permission to access the in-memory database 165 itself. As such, a user with existing permission to access the in-memory database pod 160 may also have permission to create, update, and/or delete configuration maps and the corresponding configuration profiles such as, for example, the profile 200. Limiting access in this manner may expose the configuration handler 140 internally but not to external entities outside of the cluster 150. For access to the configuration handler 140, a pod may be created to include a container that is in a permanent idle state. In order to gain access to the configuration handler 140, a user may enter the idle container from which the user may send requests internally to the configuration handler 140. However, exposing the configuration handler 140 internally in this manner may compromise user experience as well as exclude some users from accessing the configuration handler 140.

In some example embodiments, a naïve rollback mechanism that is susceptible to the loss of default parameter values (saved in the memory of the configuration handler 140) may be improved by saving default parameter values to an independent resource including, for example, a node cluster resource such as a configuration map, a persistent volume, and/or the like. Saving default parameter values in an independent resource may prevent data loss in the event the configuration handler 140 is terminated, deleted, and/or restarted. Since these independent resources may persist in the cluster 150, the default parameter values saved in these independent resources may be preserved for when the configuration handler resumes operation.

Alternatively, a configuration profile may be defined for each version of the in-memory database 165, each of which containing the configuration parameters and the corresponding default values of the in-memory database 165. The configuration handler 140 may save, for the in-memory database 165 or configuration profile (e.g., the profile 200), the parameters that were configured in, for example, a configuration map. In the event of a rollback to restore default parameter values, the configuration handler may retrieve the parameters that were configured from the configuration map and the default values from the right default configuration file for the version of the in-memory database 165. The creation of the default configuration profile may be automated by a parsing script. However, the default configuration profiles may contain a large quantity of data, which must be iterated through in an effort to locate the right parameters and thus slow down the rollback process.

Alternatively, the parameter values held in the default layer of the system database 172 may be associated with a resource, such as a configuration map, for setting the configuration parameters. The parameter values from the resource may take priority over the parameter values in the default layer. However, the parameter values in the resource may require adjustments when the in-memory database 165 undergoes an initial configuration to prevent being overwritten. Table 8 depicts an example of a configuration statement to trigger a rollback to the parameter values specified in the default layer of a system database. Here, the configuration handler 140 may track, for the in-memory database 165 and/or the profile 200, the parameters that are indicated for change in a configuration request. The configuration handler 140 may check the resource for these parameters and configure the in-memory database 165 with the corresponding value from the resource. If a parameter indicated in the configuration request is not part of the resource, the configuration handler 140 may reset its value based on the configuration request.

TABLE 8

ALTER SYSTEM ALTER CONFIGURATION('<INI-filename>', '<layer>')
    UNSET ('<section>', '<key>') WITH RECONFIGURE In some example embodiments, the deprecation of temporarily created profiles may be extended to support temporarily changed profiles. For example, temporarily created profiles may be profiles that are created via the configuration handler 140 and owning a deletion time label (with a corresponding timestamp value). Temporarily changed profiles may refer to profiles with changes executed by the configuration handler 140, a rollback time label (with a corresponding timestamp value) may be added. The time-based job scheduler may be extended such that the script that is executed may identify profiles within a deletion time label as well as profiles with a rollback time label. A list may be created to include the identifiers of the profiles with the rollback time label and sent to the configuration handler 140 such that the configuration handler 140 may restore these profiles to a previous version of the profile. In cases where a profile undergoes multiple changes, the configuration handler 140 may restore the profile back to a version that is defined as the default version of the profile. For example, the default version of the profile may be the version that is defined in the node cluster package (e.g., Helm chart) from the time the profile was deployed.

To achieve this functionality, the configuration handler 140 may be extended to handle a new version of profile request. The parameters included in a profile may form a text string in a map. The key to the parameters may be "configurationspecs." The configuration handler 140 may respond to a request to change a configuration profile by retrieving that configuration profile. Here, the configuration handler 140 may obtain the string value of "configurationspecs" and save it under the new key "rollbackversion" instead of changing the configuration profile as requested. If the "rollbackversion" key already exists in the configuration profile, it is not set again as the value of the "rollbackversion" key is set once and represents the version of the profile that was defined in the node cluster package. If the configuration profile is updated by redeploying the node cluster package, the "rollbackversion" may be removed and replaced by another version defined by the node cluster package as the version to which the configuration profile should be rolled back to. Afterwards, the value of the "configurationspecs" key may be changed as requested and the changes may be applied to the profile, for example, the profile 200, that is running in the cluster 150 as usual.

In some example embodiments, the configuration handler 140 may be configured to detect events associated with the configuration profiles. However, when the configuration handler 140 is temporarily unavailable (e.g., due to a termination, a deletion, and/or a restart of the configuration handler 140), the configuration handler 140 may fail to monitor these events and thus miss a change to or a deletion of a profile. When this happens, the in-memory database 165 may become configured with a nonexistent profile or one that has been changed. To detect when in-memory databases are configured with nonexistent configuration profiles, a time-based job scheduler may be added with job configured to check all in-memory databases running in the cluster 150 using profiles. For example, the identifiers of all profiles may be retrieved and saved in an array. For each in-memory database, a check is performed to determine whether it is configured with a profile with an identifier present in the list. If an in-memory database is configured with a profile whose identifier is absent from the list, that in-memory database may be rolled back to a default configuration profile, for example, by calling the rollback function of the configuration handler 140. It may be possible that a configuration request and a rollback request are sent to the configuration handler 140 at substantially the same time. When that happens, the rollback may be performed after the execution of the configuration request, in which case the in-memory database may be returned to its default configuration state.

In some example embodiments, the configuration handler 140 may be implemented in a Go programming language with goroutines, which are light weight threads that may be easily created. These goroutines may be used in the configuration handler 140 to detect and respond to configuration map events. Where the configuration handler 140 is expected to support a large quantity of in-memory databases should be configured, goroutines may improve the performance of the configuration handler 140 especially if the configuration of multiple in-memory databases is performed in parallel.

In a microservice environment, it may be possible for multiple product instances, such as instances of the in-memory database 165, to run as well as for the configuration of one or more product instances to undergo change, for example, as part of a change to meet usage requirements, a workaround, a fix for a defect, and/or the like. In case of configurable product instance, it may be desirable to identify differences between a current configuration of the product instance and a default configuration. Moreover, it may be desirable to know the exact configurations of each product instance in order to provide an overview of the current state of the product instances. This configuration overview may prevent scenarios in which multiple product instances are running with deprecated configurations or with different configurations even when the product instances are configured to fulfill the same requirements. The configuration overview may therefore enable a reconfiguration or a rollback of product instances, such as instances of the in-memory database 165, to a desired state. The configuration overview should be available with minimal requirement for resources and downtime.

In some example embodiments, the in-memory database 165 may be associated with one or more configuration profiles, such as the profile 200, providing an overview of the configuration of each instance of the in-memory database 165. Each configuration profile may be identified by a profile name and a version. Moreover, each configuration profile may include the configuration parameters associated with an instance of the in-memory database 165 and the corresponding values. The identifier of a configuration profile may include a profile name and a version because there may be multiple versions of the in-memory database 165. For example, in a microservice environment, different versions of the in-memory database 165 may be associated with different read-only templates with instructions for creating a corresponding container (e.g., Docker images). The identifier of the configuration profiles for different versions of the in-memory database 165 may share a same profile name but different version identifiers.

Table 9 below depicts an example of a configuration profile having multiple parameters and a single key. The configuration profile may be documents that includes the parameters in plaintext.

TABLE 9

```
apiVersion: v1
kind: ConfigMap
metadata:
    name: sample-0.0.1
data:
    configurationspecs: |
        -   filename: "example.ini"
            layer: "EXAMPLE"
            section: "example-section"
            key: "example-key"
            value: "1"
```

In the node cluster environment shown in FIG. 1A, a configuration profile, such as the profile 200, may be realized as a custom resource definition, a secret, and/or as a configuration map shown in Table 9. In other environments, it may be adequate for the configuration profile to be implemented as a text file. Because a configuration profile may exist independently within a microservice environment, the deployment of a configuration profile may not result in downtime, for example, of the in-memory database 165.

Figure 5A:
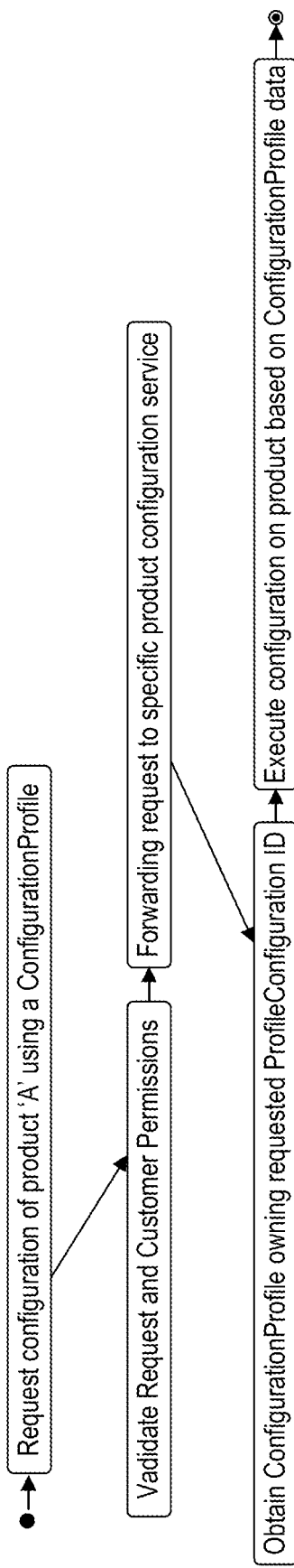
FIG. 5A depicts an example of a workflow for configuring an in-memory database, in accordance with some example embodiments.

As shown in FIG. 5A, in some example embodiments, the configuration handler 140 may configure the in-memory database 165 by at least reading a configuration profile and configuring the in-memory database 165 accordingly, without imposing any downtime at the in-memory database 165. The in-memory database 165 may be associated with a label with the name of the profile. The label makes it possible to identify the state of the in-memory database 165 (e.g., the current configuration profile used to configure the in-memory database 165). Alternatively, a list may be maintained identifying each instance of the in-memory database 165 and the profiles that are used to configure each instance.

Configuring an instance of the in-memory database 165 based on a configuration profile, such as the profile 200, may be more advantageous than configuring the instance of the in-memory database 165 by setting individual parameters. For example, the current configuration of the in-memory database 165 may be determined based on the configuration profile, which is not possible if the parameters of the in-memory database 165 are set individually. A configuration that differs from the default configuration of the in-memory database 165 may be associated with an identifier of the configuration profile that enables a tracking of the current configurations of the in-memory database 165. The use of configuration profiles may also enable instances of the in-memory database 165 to be rolled back, for example, to a previous and/or a default configuration. This rollback may be necessary, for example, when the configuration of the in-memory database 165 undergoes a temporary change to fix a defect at the in-memory database 165.

Figure 6:
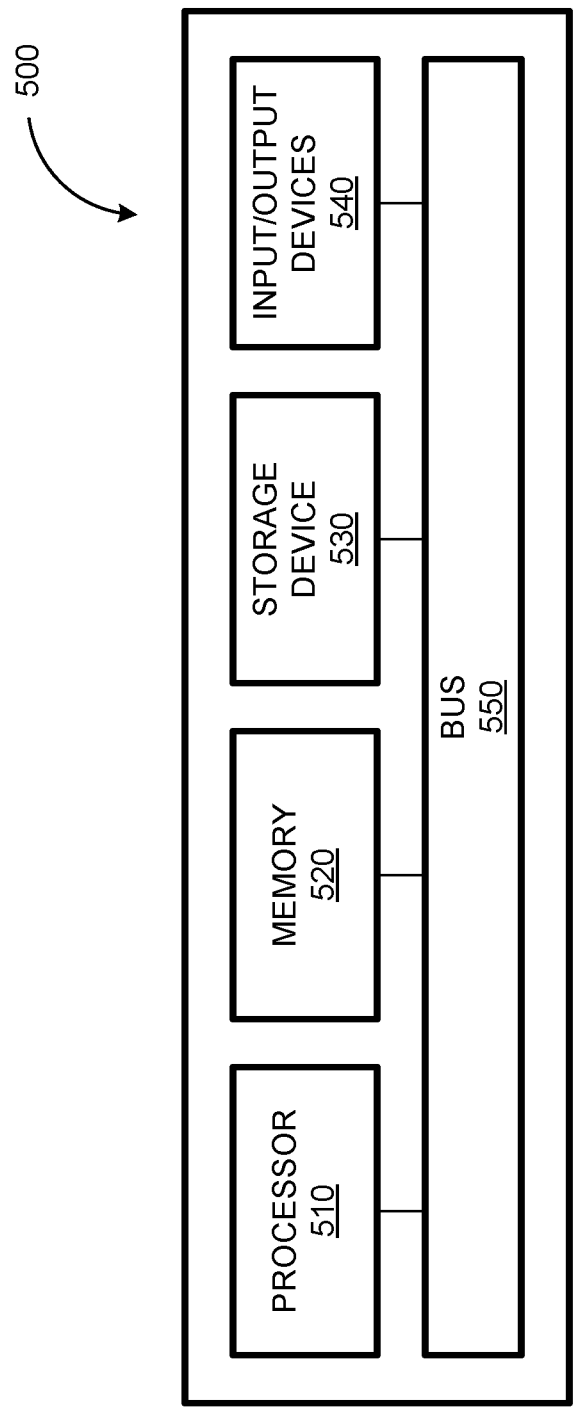
FIG. 6 depicts a block diagram illustrating an example of a computing system, in accordance with some example embodiments.
Figure 7A:
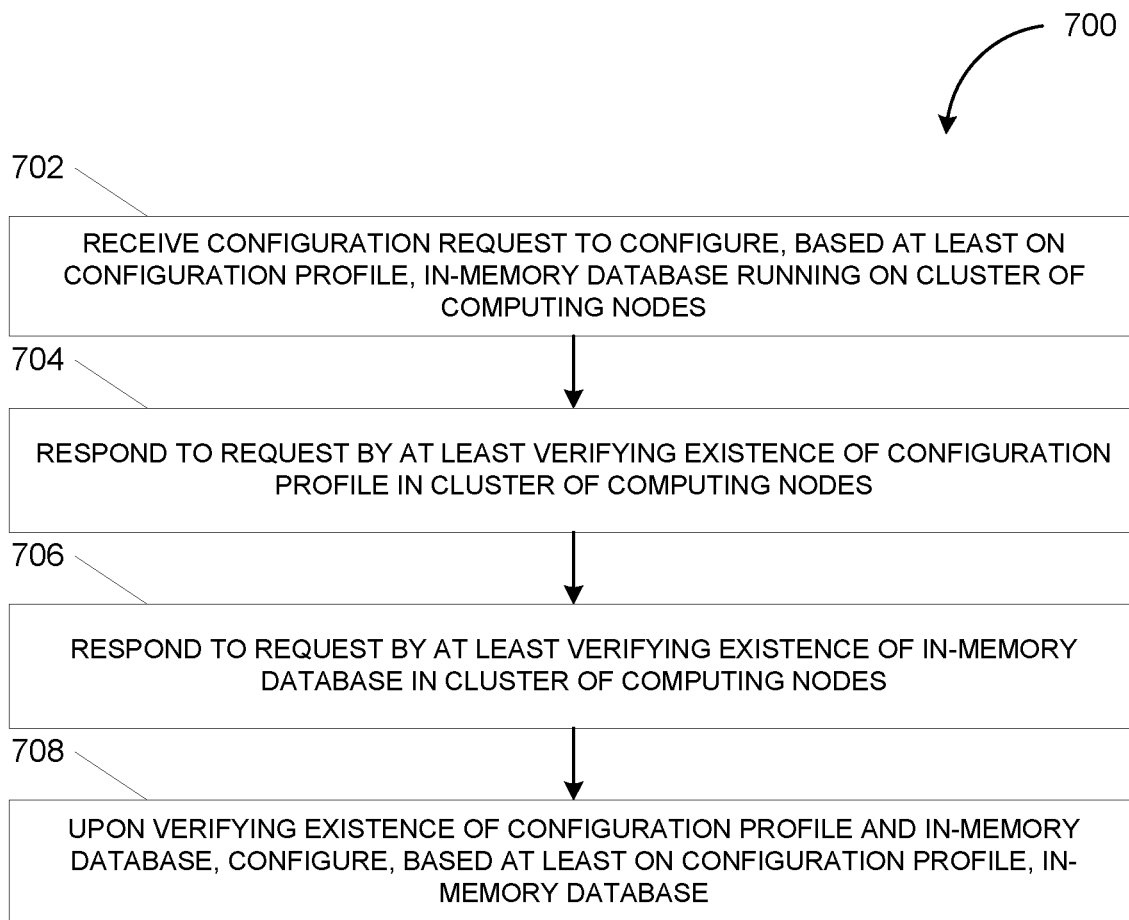
FIG. 7A depicts flowchart illustrating an example of a process for configuring an in-memory database, in accordance with some example embodiments.

FIG. 7A depicts a flowchart illustrating an example of a process 700 for configuring an in-memory database, in accordance with some example embodiments. Referring to FIGS. 1-6 and 7A, the process 700 may be performed by the configuration handler 140, for example, to configure the in-memory database 165 included in the in-memory database pod 160 running on the cluster 150 including the first node 155a, the second node 155b, and/or the like.

At 702, the configuration handler 140 may receive a configuration request to configure, based at least on a configuration profile, an instance of an in-memory database running in a cluster of computing nodes. For example, the configuration handler 140 may receive, from the client device 120, a configuration request to configure the in-memory database 165 running, for example, as part of the in-memory database pod 160 at the cluster 150. The configuration request received from the client device 120 may include one or more parameters of the in-memory database 165 and the corresponding values that these parameters should be set to as part of the configuration. Alternatively and/or additionally, the configuration request may identify a configuration profile, for example, by including the identifier associated with the profile 200.

At 704, the configuration handler 140 may respond to the configuration request by verifying an existence of the configuration profile in the cluster of computing nodes. For example, in the event the configuration request includes the identifier of a configuration profile, such as the identifier associated with the profile 200, the configuration handler 140 may verify the presence of the requested profile in the cluster 150. If the configuration handler 140 is able to locate the profile 200, for example, based on the identifier included in the configuration request, the configuration handler 140 may retrieve the parameters and the corresponding values from the profile 200. However, the configuration process may terminate if the configuration handler 140 is unable to locate the profile 200.

At 706, the configuration handler 140 may respond to the configuration request by verifying an existence of the in-memory database in the cluster of computing nodes. In some example embodiments, the configuration handler 140 may verify whether the requested instance of the in-memory database, for example, the in-memory database 165, is present in the cluster 150. The configuration process may be terminated if the configuration handler 140 determines that the requested instance of the in-memory database is not present in the cluster 150.

At 708, the configuration handler 140 may, upon verifying the existence of the configuration profile and the in-memory database, configure, based at least on the configuration profile, the in-memory database 165. For example, upon verifying the presence of the profile 200 and the in-memory database 165 at the cluster 150, the configuration handler 140 may configure the in-memory database 165 in accordance with the profile 200. In some example embodiments, the configuration handler 140 may establish a structured query language (SQL) connection and execute a configuration statement for each parameter of the in-memory database 165 affected by the configuration request. Upon successfully configuring an in-memory database, such as the in-memory database 165, the configuration handler 140 may close the SQL connection. Furthermore, the configuration handler 140 may update the identifier of the profile that was used in the configuration, change an existing profile identifier to that of the one that was used in the configuration, or add an indication to indicate that no profile was used in the configuration (e.g., 'single-param').

In a microservice environment, configuration profiles, such as the profile 200, may be used to unify the configuration of legacy product instances of the same type. Configuration profiles may, as noted, make it possible to determine differences between the current configuration of an instance of the in-memory database 165 and the default configuration of the in-memory database 165. In some cases, instances of the in-memory database 165 configured with the same configuration profile may require a temporary reconfiguration, for example, in order to resolve a defect at the in-memory database 165. Alternatively, a configuration profile may be created without going through a release process. These scenarios may be addressed using temporary configuration profiles that should expire and cease to exist after a certain time (or quantity of time).

In some example embodiments, the configuration handler 140 may monitor for changes in the configuration profiles such as the profile 200. For example, the configuration handler 140 may listen for changes in the configuration profiles or check the state of each configuration profile. In a container-based environment, such as the one shown in FIG. 1A, this monitoring may be performed by watching the events on the resource (e.g., the configuration profiles 200, the in-memory database pod 160, and/or the like) and defecting changes in the configuration maps, secrets, and/or custom resource definitions. Alternatively, the configuration handler 140 may perform this monitoring by applying a polling method, which may include continuously checking for changes in the configuration profiles (e.g., plaintext files) of the in-memory database 165.

Figure 5B:
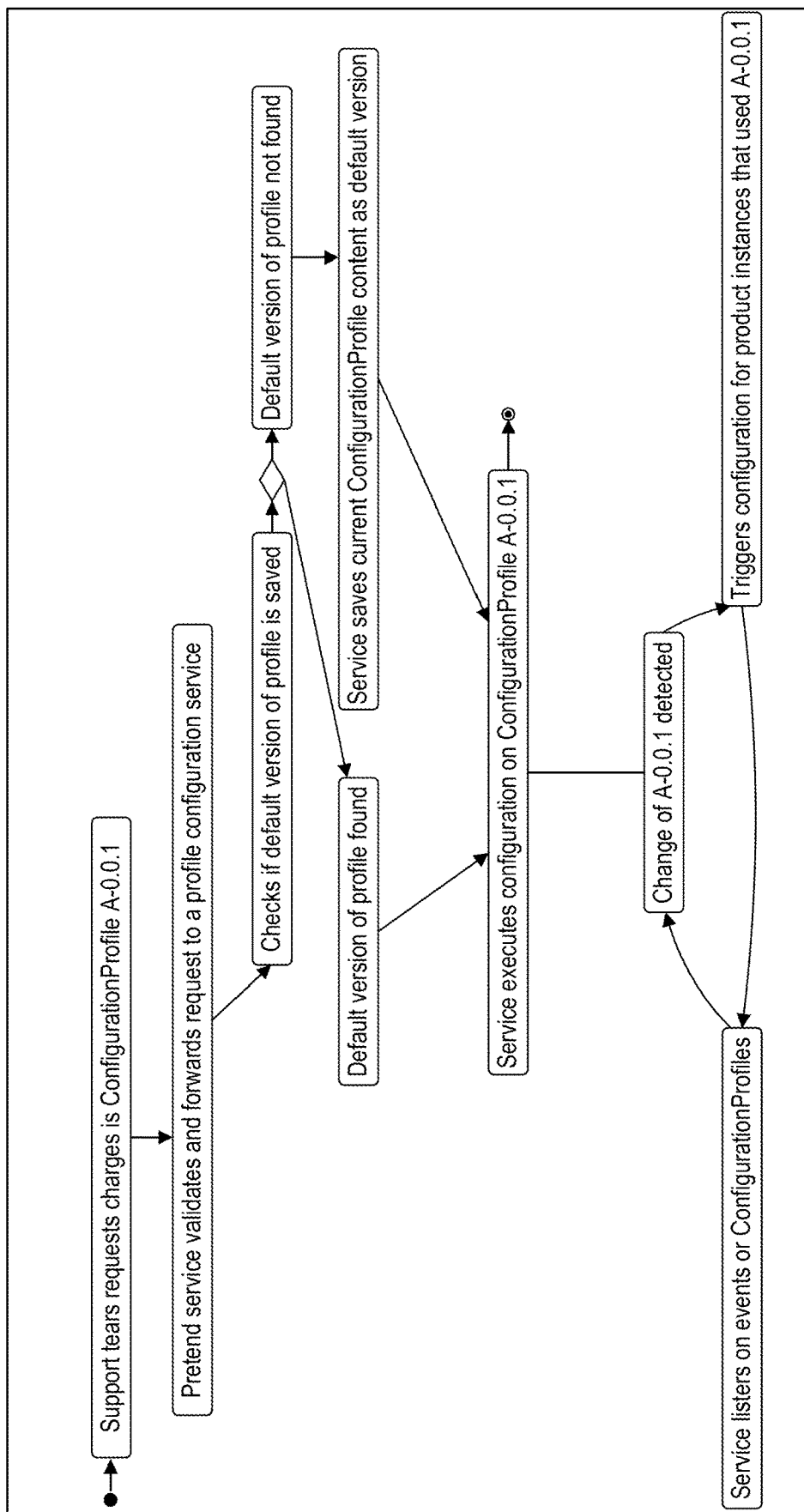
FIG. 5B depicts an example of a workflow for updating the configuration of an in-memory database, in accordance with some example embodiments.

As shown in FIG. 5B, the configuration handler 140 may receive, from the client device 120, a profile reconfiguration request which may include, optionally, an indication of how long the requested configuration changes are valid for. In response to detecting a change in the configuration profile, the configuration handler 140 may trigger a reconfiguration process in which an instance of the in-memory database 165 is configured based on the configuration profile. This reconfiguration may be performed by the configuration handler 140 or a separate product configuration service.

Figure 5C:
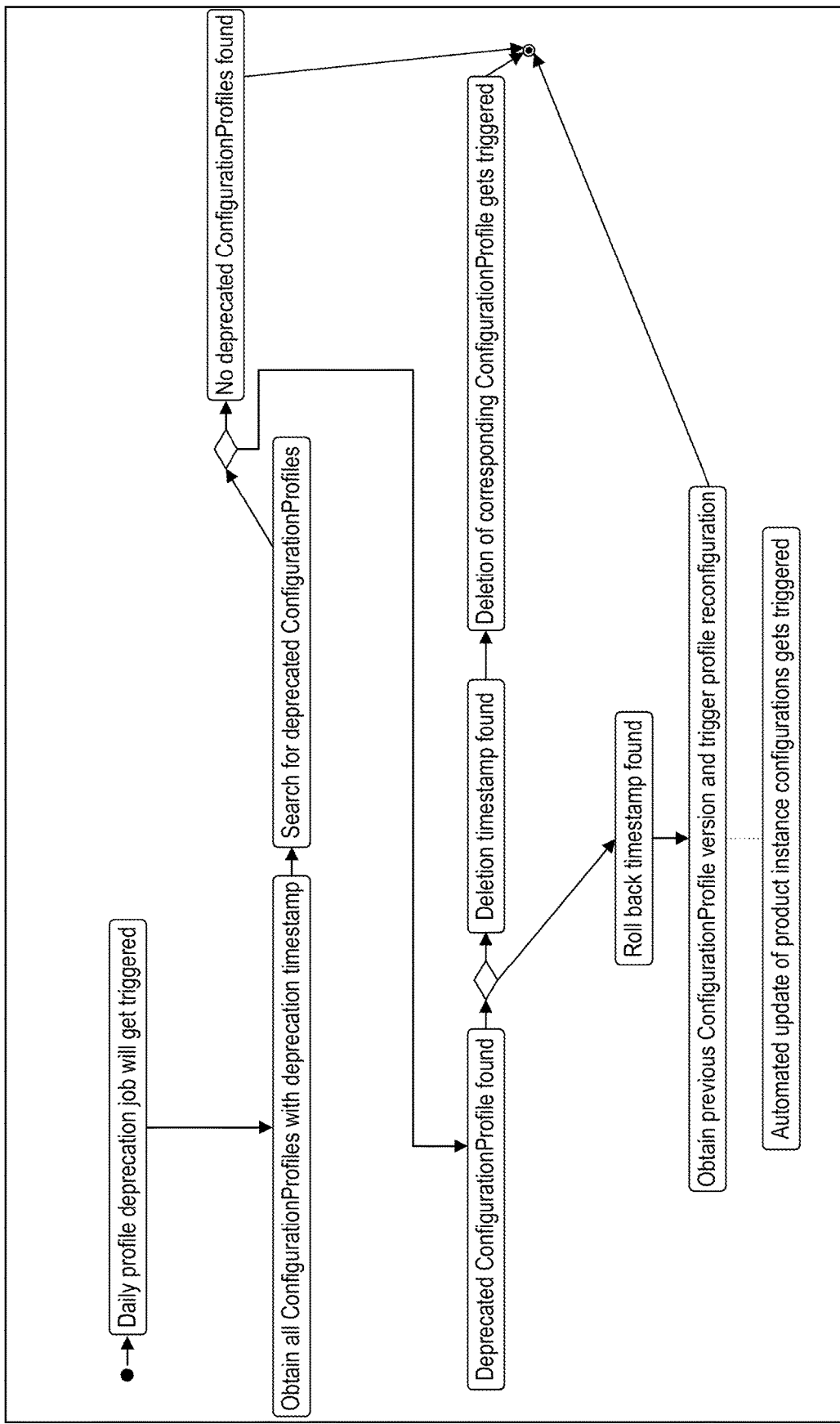
FIG. 5C depicts an example of a workflow for deprecating a configuration profile for configuring an in-memory database, in accordance with some example embodiments.

Referring to FIGS. 5B-C, the deprecating of a configuration profile may include determining whether a current version of the configuration profile is saved (e.g., to a resource or a memory of the configuration handler 140) before changing the configuration profile. A current version of the configuration profile may be saved in the event one is not already saved, for example, to a resource and/or to a memory of the configuration handler 140. In the container based environment shown in FIG. 1A, the contents of the configuration profile may be saved to a configuration map. For newly created configuration profiles, the configuration handler 140 may omit checking for the current version of the configuration profile.

Upon creating and/or changing the configuration profile, the configuration handler 140 may add, to the configuration profile, a deprecation timestamp indicative of when the configuration profile should be deprecated. In some cases, this deprecation timestamp may specify the lifespan for the configuration profile. In the absence of such a deprecation timestamp, the configuration handler 140 may apply a default value (e.g., 7 days or another length of time). In the container based environment shown in FIG. 1A, the deprecation timestamp may be label in a corresponding configuration map. For a newly created configuration profile, the deprecation timestamp may include a deletion time whereas for a reconfiguration profile, the deprecation timestamp may include a rollback time.

In some example embodiments, a time-based job scheduler may trigger a regularly scheduled job to identify configuration profiles having a deprecation timestamp. An expired profile may be identified by comparing the deprecation timestamp, for example, the deletion time or the rollback time, to a current time.

As shown in FIG. 5C, for a deprecation timestamp with a rollback time, the configuration handler 140 may retrieve a previous version of the configuration profile, for example, a default configuration profile, such that the configuration of the in-memory database 165 is restored based on the previous version of the configuration profile.

For deprecation timestamps with a deletion time, the configuration handler 140 may delete the corresponding configuration profile based on the deletion time. The deletion of a configuration profile may trigger a rollback at instances of the in-memory database 165 configured based on that configuration profile. This rollback may restore the configuration of in-memory database 165 to a default configuration, which may be static and applicable to all instances of a product of a same type. Alternatively, different versions of the default configuration may be applicable to different instances of the product, such as the in-memory database 165. When that is the case, the configuration handler 140 may track the version that is applicable to each instance of the in-memory database 165 and perform a rollback to restore each instance of the in-memory database 165 to the appropriate version of the default configuration.

Figure 7B:
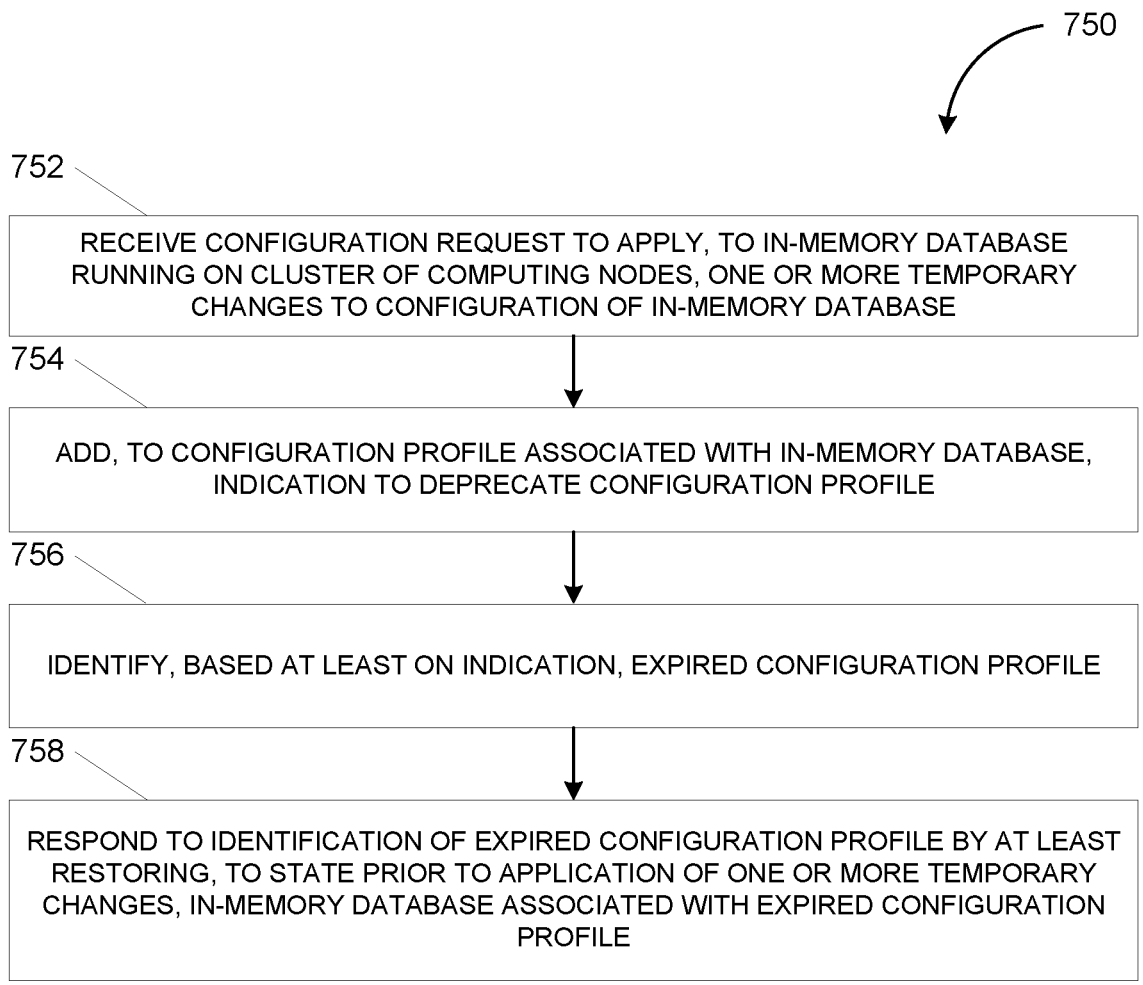
FIG. 7B depicts a flowchart illustrating an example of a process for deprecating a configuration profile for configuring an in-memory database, in accordance with some example embodiments.

FIG. 7B depicts a flowchart illustrating an example of a process 750 for deprecating a configuration profile for configuring an in-memory database, in accordance with some example embodiments. Referring to FIGS. 1-6 and 7B, the process 750 may be performed by the configuration handler 140, for example, to deprecate a configuration profile used to configure the in-memory database 165, which may be included in the in-memory database pod 160 running on the cluster 150 including the first node 155*a*, the second node 155*b*, and/or the like.

At 752, the configuration handler 140 may receive a configuration request to apply, to an in-memory database running on a cluster of computing nodes, one or more temporary changes to the configuration of the in-memory database. In some example embodiments, the configuration handler 140 may receive a configuration request to apply, to the in-memory database 165 running as part of the in-memory database pod 160 running in the cluster 150, one or more temporary changes. Such a configuration request may include a temporary configuration profile or one or more temporary changes to the parameters of the in-memory database 165. It should be appreciated that the one or more temporary changes may be applied to the in-memory database 165 in order to resolve a defect at the in-memory database 165.

At 754, the configuration handler 140 may add, to a configuration profile associated with the in-memory database, an indication to deprecate the configuration profile. In some example embodiments, upon creating a temporary configuration profile and/or applying temporary changes to the configuration profile of the in-memory database 165, the configuration handler 140 may add, to the configuration profile, a deprecation timestamp indicative of when the configuration profile should be deprecated. For example, this deprecation timestamp may specify the lifespan for the configuration profile such that the in-memory database 165 may be restored to a previous state upon an expiration of the specified lifespan. In the absence of such a deprecation timestamp, the configuration handler 140 may apply a default value (e.g., 7 days or another length of time). In the container based environment shown in FIG. 1A, the deprecation timestamp may be label in a corresponding configuration map. For a newly created temporary configuration profile, the deprecation timestamp may include a deletion time whereas for a configuration profile with temporarily added changes, the deprecation timestamp may include a rollback time.

At 756, the configuration handler 140 may identify, based at least on the indication, an expired configuration profile. In some example embodiments, profile deprecation may be performed on a periodic basis to identify deprecated profiles within the cluster 150. For example, profile deprecation may be realized with a node cluster time-based job scheduler (e.g., CronJob and/or the like) and a script (e.g., Python3 and/or the like). The configuration handler 140 may deploy the time-based job scheduler upon creation of the configuration handler 140. The script may be executed to obtain all configuration profiles (e.g., configuration maps and/or the like) with a deprecation timestamp (e.g., a deletion time, a rollback time, and/or the like). The deletion time and/or the rollback time associated with a configuration profile may be compared to a current time to determine whether the configuration profile should be deprecated.

At 758, the configuration handler 140 may respond to the identification of an expired configuration profile by at least restoring, to a state prior to the application of the one or more temporary changes, the in-memory database 165 associated with the expired configuration profile. In some example embodiments, if the configuration handler 140 determines that the in-memory database 165 is associated with a deprecated configuration profile (e.g., a configuration profile past its deletion time or rollback time), the configuration handler 140 may at least perform a rollback to restore the configurations of the in-memory database 165 to a previous state (e.g., a default configuration and/or the like). That is, the rollback may be performed to remove the temporary changes applied to the configuration of the in-memory database 165. In the case the configuration handler 140 created a temporary configuration profile to effect the temporary changes to the in-memory database 165, the configuration handler 140 may be further configured to remove the temporary configuration profile upon reaching the deletion time associated with the temporary configuration profile.

FIG. 6 depicts a block diagram illustrating a computing system 500 consistent with implementations of the current subject matter. Referring to FIGS. 1-6, the computing system 500 can be used to implement the configuration handler 140 and/or any components therein.

As shown in FIG. 6, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the configuration handler 140 and/or the like. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions, which when executed by the at least one data processor, result in operations comprising:
        receiving, at a microservice, a configuration request to apply, to one or more configuration parameters of an instance of an in-memory database running on a cluster of computing nodes, one or more temporary changes;
        in response to the configuration request, adding, by the microservice and to a configuration profile associated with the instance of the in-memory database, a value of the one or more configuration parameters with the one or more temporary changes and an indicator to deprecate the configuration profile upon an expiration of the one or more temporary changes, the configuration profile being persisted in an independent resource within the cluster of computing nodes separate from the microservice;
        upon the expiration of the one or more temporary changes, deprecating, by the microservice, the configuration profile; and
        upon deprecating the configuration profile, retrieving, by the microservice and from the independent resource, a default value for each of the one or more configuration parameters of the instance of the in-memory database and restoring the one or more configuration parameters of the instance of the in-memory database to the default value before a subsequent reconfiguration of the one or more configuration parameters to another value.

2. The system of claim 1, wherein the indicator includes a deprecation timestamp.

3. The system of claim 2, wherein the configuration request specifies a lifespan of the one or more temporary changes, and wherein the deprecation timestamp corresponds to the lifespan indicated in the configuration request.

4. The system of claim 2, wherein the deprecation timestamp corresponds to a default lifespan of the one or more temporary changes in response to the configuration request failing to specify a lifespan for the one or more temporary changes.

5. The system of claim 2, wherein the deprecating of the configuration profile is performed in response to a current time exceeding the deprecation timestamp.

6. The system of claim 1, wherein the configuration request comprises a request to create the configuration profile to include the value of the one or more configuration parameters with the one or more temporary changes.

7. The system of claim 6, wherein the deprecating of the configuration profile further includes deleting the configuration profile.

8. The system of claim 1, wherein the configuration request comprises a request to apply, to the configuration profile currently used for configuring the instance of the in-memory database, the one or more temporary changes.

9. The system of claim 1, wherein the one or more temporary changes are applied to resolve a defect at the in-memory database.

10. The system of claim 1, further comprising:
creating, by a job scheduler, a job executing a script to identify one or more expired configuration profiles, and add the one or more expired configuration profiles to a list for deprecation.

11. The system of claim 1, wherein the instance of the in-memory database is part of a container forming pod, and wherein the container further includes one or more resources required to satisfy one or more dependencies associated with the in-memory database.

12. The system of claim 1, wherein the instance of the in-memory database includes a system database and at least one tenant database, and wherein the application of the one or more temporary changes includes adjusting the one or more parameters of the system database to configure the system database and/or the at least one tenant database.

13. The system of claim 1, wherein the configuration profile is defined as a configuration map maintained at the independent resource within the cluster of computing nodes.

14. A computer-implemented method, comprising:
receiving, at a microservice, a configuration request to apply, to one or more configuration parameters of an instance of an in-memory database running on a cluster of computing nodes, one or more temporary changes;
in response to the configuration request, adding, by the microservice and to a configuration profile associated with the instance of the in-memory database, a value of the one or more configuration parameters with the one or more temporary changes and an indicator to deprecate the configuration profile upon an expiration of the one or more temporary changes, the configuration profile being persisted in an independent resource within the cluster of computing nodes separate from the microservice;
upon the expiration of the one or more temporary changes, deprecating, by the microservice, the configuration profile; and
upon deprecating the configuration profile, retrieving, by the microservice and from the independent resource, a default value for each of the one or more configuration parameters of the instance of the in-memory database and restoring, the one or more configuration parameters of the instance of the in-memory database to the default value before a subsequent reconfiguration of the one or more configuration parameters to another value.

15. The method of claim 14, wherein the indicator includes a deprecation timestamp.

16. The method of claim 15, wherein the configuration request specifies a lifespan of the one or more temporary changes, and wherein the deprecation timestamp corresponds to the lifespan indicated in the configuration request.

17. The method of claim 15, wherein the deprecation timestamp corresponds to a default lifespan of the one or more temporary changes in response to the configuration request failing to specify a lifespan for the one or more temporary changes.

18. The method of claim 15, wherein the deprecating of the configuration profile is performed in response to a current time exceeding the deprecation timestamp.

19. A non-transitory computer readable medium storing instructions, which when executed by at least one data processor, result in operations comprising:
receiving, at a microservice, a configuration request to apply, to one or more configuration parameters of an instance of an in-memory database running on a cluster of computing nodes, one or more temporary changes to;
in response to the configuration request, adding, by the microservice and to a configuration profile associated with the instance of the in-memory database, a value of the one or more configuration parameters with the one or more temporary changes and an indicator to deprecate the configuration profile upon an expiration of the one or more temporary changes, the configuration profile being persisted in an independent resource within the cluster of computing nodes separate from the microservice;
upon the expiration of the one or more temporary changes, deprecating, by the microservice, the configuration profile; and
upon deprecating the configuration profile, retrieving, by the microservice and from the independent resource, a default value for each of the one or more configuration parameters of the instance of the in-memory database and restoring the one or more configuration parameters of the instance of the in-memory database to the default value before a subsequent reconfiguration of the one or more configuration parameters to another value.

\* \* \* \* \*